(12) United States Patent
List Clausen

(10) Patent No.: US 11,745,238 B2
(45) Date of Patent: Sep. 5, 2023

(54) CLAMPING STRAP

(71) Applicant: HYDRO EXTRUDED SOLUTIONS AS, Oslo (NO)

(72) Inventor: Edvin List Clausen, Aabenraa (DK)

(73) Assignee: HYDRO EXTRUDED SOLUTIONS AS, Oslo (NO)

( * ) Notice: Subject to any disclaimer, the term of this patent is extended or adjusted under 35 U.S.C. 154(b) by 170 days.

(21) Appl. No.: 17/275,556

(22) PCT Filed: Sep. 25, 2019

(86) PCT No.: PCT/EP2019/075817
§ 371 (c)(1),
(2) Date: Mar. 11, 2021

(87) PCT Pub. No.: WO2020/064808
PCT Pub. Date: Apr. 2, 2020

(65) Prior Publication Data
US 2021/0362206 A1    Nov. 25, 2021

(30) Foreign Application Priority Data

Sep. 26, 2018 (SE) .................................... 1851147-7

(51) Int. Cl.
*B21C 23/06* (2006.01)
*B21C 35/02* (2006.01)
(Continued)

(52) U.S. Cl.
CPC ............ *B21C 23/06* (2013.01); *B21C 35/023* (2013.01); *B21K 23/00* (2013.01); *B60K 15/07* (2013.01)

(58) Field of Classification Search
CPC ....... B21C 23/06; B21C 23/023; B21K 23/00; B60K 15/067; B60K 15/0675; B60K 15/07

See application file for complete search history.

(56) References Cited

U.S. PATENT DOCUMENTS 4,093,254 A * 6/1978 Ezaki ..................... B60K 15/00
280/783
4,369,981 A * 1/1983 Chiba .................. B60K 15/067
280/801.1
(Continued)

FOREIGN PATENT DOCUMENTS

CN      201633536     11/2010
CN      102601220      7/2012
(Continued)

OTHER PUBLICATIONS

Office Action dated Oct. 31, 2022 in Chinese Patent Application No. 201980062937.2, with English-language translation.
(Continued)

*Primary Examiner* — Jason L Vaughan
(74) *Attorney, Agent, or Firm* — Wenderoth, Lind & Ponack, L.L.P.

(57) ABSTRACT

A method (100) of manufacturing a clamping strap (10) configured to hold and support a hanging object (20) against a structure (21), which is to carry the hanging object, and a clamping strap obtainable by said method; said method comprising providing (101) an extruded elongated aluminium profile having an initial material thickness ($T_0$) and an initial cross-sectional area ($A_0$), said profile having a longitudinal direction, which coincides with the extrusion direction of the profile; forming the profile in a bending step (102) into a shape comprising a first end attachment portion (1*a*), a second end attachment portion (1*b*), and an intermediate portion (2) located between said first and second end attachment portions (1*a*; 1*b*) in a longitudinal direction of the profile (11), said intermediate portion (2) being configured to at least partially encircle the hanging object (20) when mounted to the structure (21); said method including forming said profile by means of locally thinning the profile in a longitudinal direction of the profile (11), in a thinning (Continued)

C operation (103) to obtain one or more thinned portions having a lower material thickness than the initial material thickness ($T_0$); or locally axially compressing the profile in an axial compression step (104) to obtain one of more axially compressed portions having a higher material thickness than the initial material thickness ($T_0$) and/or greater cross sectional area than the initial cross-sectional area ($A_0$); or by a combination of said thinning operation (103) and said axial compression step (104).

15 Claims, 5 Drawing Sheets

(51) Int. Cl.
  *B21K 23/00* (2006.01)
  *B60K 15/07* (2006.01)

(56) References Cited

U.S. PATENT DOCUMENTS

| | | | | |
|---|---|---|---|---|
| 4,416,461 A * | 11/1983 | Hayashi | ............... | B60K 15/067 280/783 |
| 4,765,635 A * | 8/1988 | Okada | ............... | B62D 43/10 280/834 |
| 4,886,180 A * | 12/1989 | Bonczyk | ............... | B60K 15/067 220/651 |
| 4,930,811 A * | 6/1990 | Tsukada | ............ | B60K 15/03177 280/834 |
| 5,267,714 A * | 12/1993 | Nelson, II | ............ | B60K 15/067 248/222.51 |
| 6,578,727 B2 * | 6/2003 | Schmidt | ............... | B62D 27/065 220/562 |
| 7,819,431 B2 * | 10/2010 | Minami | ............... | B60K 15/067 280/834 |
| 8,382,162 B2 * | 2/2013 | Hourai | ................ | B60K 15/067 280/830 |
| 8,579,331 B2 * | 11/2013 | Hayashi | ............ | H01M 8/04201 280/830 |
| 9,376,013 B2 * | 6/2016 | Mathew | ................. | B60K 15/07 |
| 9,975,422 B2 * | 5/2018 | Bruns | ................. | B60K 15/067 |
| 9,981,550 B2 * | 5/2018 | Shoji | .................... | B60K 15/067 |
| 11,491,867 B2 * | 11/2022 | Cragel | .................... | C09D 5/08 |
| 2001/0020622 A1 * | 9/2001 | Schmidt | ............... | B60K 15/067 220/562 |
| 2011/0174856 A1 * | 7/2011 | Hayashi | ................. | B60K 15/07 224/538 |
| 2014/0103628 A1 * | 4/2014 | De Biasi | ................ | F16M 11/00 280/834 |
| 2019/0030586 A1 | 1/2019 | Hodoya et al. | | |

FOREIGN PATENT DOCUMENTS

| | | |
|---|---|---|
| CN | 106994490 | 8/2017 |
| CN | 108290496 | 7/2018 |
| DE | 100 02 990 | 8/2001 |
| DE | 10 2015 119 859 | 5/2017 |
| DE | 102015119859 A1 | 5/2017 |
| DE | 102015119859 A1 | 5/2017 |
| DE | 102016104216 | 9/2017 |
| EP | 3 170 570 | 5/2017 |
| GB | 2 117 438 | 10/1983 |
| JP | 2009-1990 | 1/2009 |

OTHER PUBLICATIONS

International Preliminary Report on Patentability of International Application No. PCT/EP2019/075817, dated Dec. 8, 2020, 7 pages.
Notice of Allowance dated Nov. 21, 2022 in corresponding European Patent Application No. 19783450.0.
International Search Report and Written Opinion for App. No. PCT/EP2019/075817, dated Dec. 13, 2019, 10 pages.

* cited by examiner a)

b)

c)

d)

e)

CLAMPING STRAP

CROSS-REFERENCE TO RELATED APPLICATIONS

This application is a national stage application of International Application No. PCT/EP2019/075817, filed Sep. 25, 2019, which claims priority to SE 1851147-7, filed Sep. 26, 2018, the disclosures of each of which are incorporated by reference herein.

TECHNICAL FIELD

The present disclosure relates to a method of manufacturing a clamping strap configured to hold and support a hanging object against a structure which is to carry the hanging object, in particular to a clamping strap for fastening a fuel tank to a vehicle. The present disclosure also relates to a clamping strap manufactured by the method.

BACKGROUND

Clamping straps for fastening hanging objects to a structure may be used in certain industries, for example, within the automotive industry. Automotive fuel tanks may generally be supported and attached to the underbody of a vehicle by one or more clamping support straps. These support straps may be flat, elongated, and extend under the fuel tank. Both ends of the support strap may then be secured to the automotive vehicle frame and supporting the fuel tank and securing it to the vehicle. Traditionally, support straps for fuel tanks may typically be constructed of steel for low cost construction.

SUMMARY

In some embodiments, the present disclosure relates to a clamping strap that may be configured to hold and support a hanging object against a structure which is to carry the hanging object. The method may include providing an extruded elongated aluminum profile having an initial material thickness ($T_0$) and an initial cross-sectional area ($A_0$), the profile having a longitudinal direction, which coincides with the extrusion direction of the profile; forming the profile in a bending step into a shape comprising a first end attachment portion, a second end attachment portion, and an intermediate portion located between the first and second end attachment portions in a longitudinal direction of the profile, the intermediate portion being configured to at least partially encircle the hanging object when mounted to the structure. The method may further include forming the profile by locally thinning the profile in a longitudinal direction of the profile in a thinning operation to obtain one or more thinned portions having a lower material thickness than the initial material thickness ($T_0$), where the thinning operation may be performed prior to the bending step; or locally axially compressing the profile in an axial compression step to obtain one of more axially compressed portions having a higher material thickness than the initial material thickness ($T_0$) and/or greater cross sectional area than the initial cross-sectional area ($A_0$); or by a combination of the thinning operation and the axial compression step.

The axial compression step may suitably include locally axially compressing the first and/or the second end attachment portions, so that the first and/or second end attachment portions attains a material thickness ($T_{1a}$, $T_{1b}$), where $T_{1a}>T_0$ and/or $T_{1b}>T_0$, or a cross sectional area ($A_{1a}$, $A_{1b}$), where $A_{1a}>A_0$ and/or $A_{1b}>A_0$.

The bending step may suitably include forming the intermediate portion into a base portion, a first leg portion, and a first bend portion, wherein the first leg portion is located between the first end attachment portion and the first bend portion, and the first bend portion is located between the first leg portion and the base portion.

The thinning operation may suitably include locally thinning the profile along a section of the profile, which is to form the base portion, so that the base portion attains a material thickness ($T_3$), where $T_3<T_0$. The thinning operation (103) may further suitably include locally thinning the profile along a section of the profile, which is to form the first leg portion, so that the first leg portion attains a material thickness ($T_{4a}$), where $T_{4a}<T_0$.

The axial compression step may suitably include locally axially compressing the first bend portion so that the first bend portion attains a material thickness ($T_{5a}$), where $T_{5a}>T_0$, or a cross sectional area ($A_{5a}$), where $A_{5a}>A_0$.

The bending step further may suitably include forming a second leg portion, and a second bend portion in the intermediate portion, wherein the second leg portion may be located between the second end attachment portion and the second bend portion, and the second bend portion is located between the second leg portion and the base portion.

The axial compression step may suitably include locally axially compressing the second bend portion so that the second bend portion attains a material thickness ($T_{5b}$), where $T_{5b}>T_0$, or a cross sectional area (A), where $A_{5b}>A_0$; and/or locally axially compressing the second leg portion so that the second leg portion attains a material thickness ($T_{4b}$), where $T_{4b}>T_0$, or a cross sectional area ($A_{4b}$), where $A_{4b}>A_0$ The method may further suitably include a cold forging step, in which an attachment aperture is formed in the first and/or the second end attachment portions. The greatest cross sectional area of the thus obtained clamping strap may suitable be greater than or equal to $1.2 \times A_0$. The method may further suitably include press forming one or more longitudinal grooves.

In some embodiments, the present disclosure may also describe a clamping strap which may be obtained by the above described method, the clamping strap being configured to hold and support a hanging object against a structure, which is to carry the hanging object, and the strap being in the form of an elongated and bent aluminum profile including a first end attachment portion and a second end attachment portion, each being adapted for attachment to the structure to which the hanging object is to be mounted, and an intermediate portion configured to at least partially encircle the hanging object when mounted to the structure, the intermediate portion comprising a base portion located between the first and second end attachment portions; a first bend portion located between the first end attachment portion and the base portion; and a leg portion located between the first end attachment portion and the bend portion. The base portion may have a cross sectional area ($A_3$), the first bend portion has a cross sectional area ($A_{5a}$), the first a leg portion has a cross sectional area ($A_{4a}$), and the first end attachment portion has a cross sectional area ($A_{1a}$), where suitably $A_3 \leq A_{5a} < A_{1a}$, and $A_{4a} \leq A_{5a} < A_{1a}$, i.e. $A3=A_{5a}<A_{1a}$ or $A_3<A_{5a}<A_{1a}$, and $A_{4a}=A_{5a}<A_{1a}$, or $A_{4a}<A_{5a}<A_{1a}$.

The base portion and/or the first leg portion may suitably have a cross sectional area, which is 75 to 100% of the cross sectional area in the first bend portion, and the first end attachment portion may have a cross sectional area, which is 150-250% of the cross sectional area in the base portion. The base portion and/or the first leg portion can have a cross sectional area of 50-60 mm², the first bend portion can have a cross sectional area of 75-85 mm², and the first end attachment portion can have a cross sectional area of 90-110 mm². The base portion can further comprise a portion having a greater cross sectional area than adjacent parts of the base portion, the portion being configured to allow connection of another strap component oriented at an angle in relation to the clamping strap.

BRIEF DESCRIPTION OF THE DRAWINGS

A better understanding of the clamping strap and the method of the present disclosure will be had upon reference to the following detailed description when read in conjunction with the accompanying drawing, wherein like reference characters refer to like parts throughout the several views, and in which.

Figure 1:
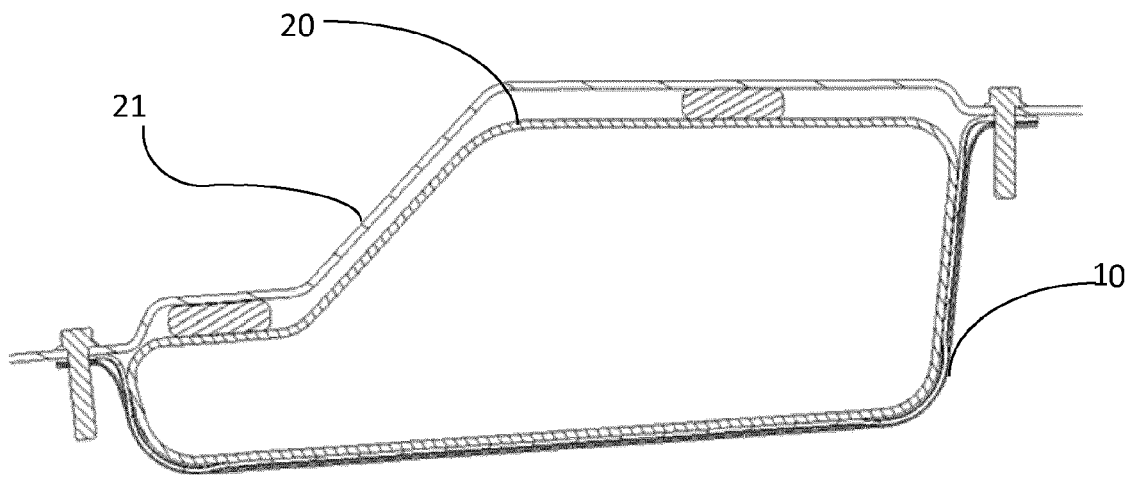
FIG. 1 illustrates how a clamping strap is used to hold and support a fuel tank to a vehicle.

Persons of ordinary skill in the art will appreciate that elements in the figures are illustrated for simplicity and clarity so not all connections and options have been shown to avoid obscuring the inventive aspects. For example, common but well-understood elements that are useful or necessary in a commercially feasible embodiment are not often depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein are to be defined with respect to their corresponding respective areas of inquiry and study except where specific meaning have otherwise been set forth herein.

DETAILED DESCRIPTION

Within many technical fields, and in particular within the automotive industry, there is a continuous striving to reduce the weight of components, and there may be a need for lightweight components for fastening hanging objects to a structure, in particular for holding and supporting fuel tanks to the body of a vehicle, and for methods of manufacturing such components.

When contemplating weight reduction in constructions comprising metal components, it may often be suggested that heavy materials be replaced by more lightweight materials. For example, steel components can be replaced by components made of aluminum. However, for components carrying heavy loads, this is not so easily done, because aluminum may not be able to offer the material properties of steel. In order to compensate for the lower material properties the gauge has often to be increased, making this choice of material less practical due to increase of metal needed and its relatively high price.

Conventional tank straps may be characterized by having high local loads at body connection areas and at lower corner radii. Straps may normally be produced from steel with simple forming, sometimes using support plates or double walls at the ends to increase strength and/or stiffness locally. For components for clamping and supporting hanging objects to a structure, in particular for holding and supporting fuel tanks to the body of a vehicle, it has been found that merely replacing a conventional clamping steel strap with a similar one made of aluminum does not lead to a successful result due to not resulting in a desired weight reduction due to the need of higher material thickness. In order to obtain the desired low weight and adequate performance, the clamping strap may benefit from being tailored with respect to the specific shape and weight of the object that it is to hold and support.

In some embodiments, the present disclosure provides a method for manufacturing a clamping strap suitable for holding and supporting a hanging object against a structure which is to carry the hanging object, which has such a configuration that it can be made of aluminum, in spite of using aluminum with strength lower than in steel, and a clamping strap obtained by this method. The present method may allow versatile and flexible manufacture of clamping straps, so that optimized and tailored clamping strap design may be obtained, which is adapted to intended situation of use.

A clamping strap may be given reduced weight, while maintaining sufficient strength by providing a higher material thickness and/or greater cross sectional area in the high loaded areas of the clamping strap, and lower material thickness and/or smaller cross sectional area in areas of the clamping strap where the load is lower during use. By such optimization, the weight may typically be reduced more than 60% as compared to a conventional steel strap. The clamping strap of the present disclosure is particularly suitable for use as a tank strap, e.g., for holding and supporting fuel tanks to the body of a vehicle, but the strap may be used in any application where an object is to be held and supported against a structure, and may be therefore advantageously configured and dimensioned to hold and support a hanging fuel tank to a vehicle, which is to carry the hanging fuel tank, which can typically have a weight of 40-80 kg. For example, the strap can have an average width of 10-40 mm and an average thickness of 1.5-4.5 mm.

FIG. 1 illustrates, in one embodiment, how a hanging object 20 may be clamped against a structure 21 by means of a clamping strap 10. In this case, it is a fuel tank which is clamped to the underbody of a vehicle by means of clamping straps.

Figure 2:
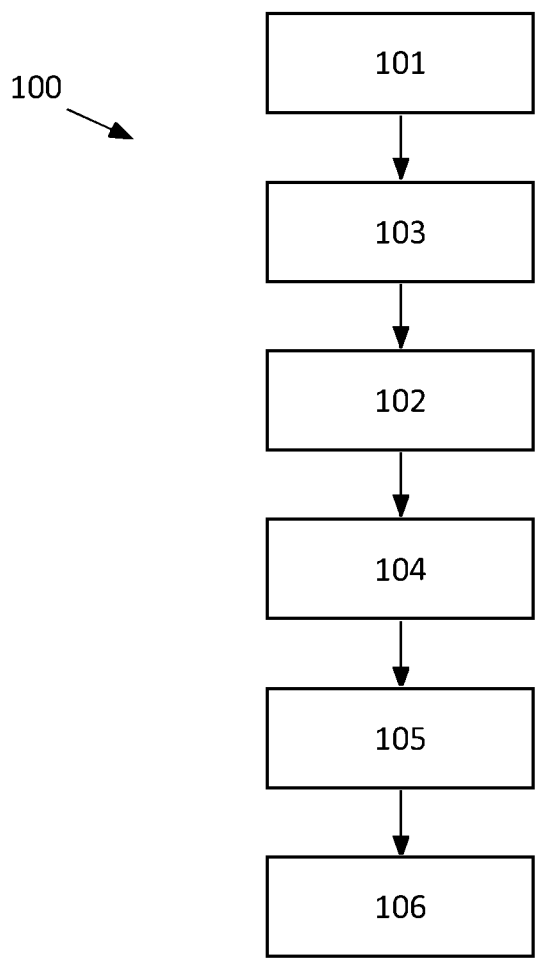
FIG. 2 schematically illustrates the method of the present disclosure.

In one embodiment of the present disclosure, method 100 is schematically illustrated in FIG. 2 and may comprise providing 101 an extruded elongated aluminum profile having an initial material thickness ($T_0$) and an initial cross-sectional area ($A_0$). In some embodiments, the extruded profile may be suitably made of a 6000 series aluminum alloy, and may for example have a weight of 200-500 g/m. The profile may have a longitudinal direction that may coincide with the extrusion direction of the profile, and which may also be the longitudinal direction of the resulting clamping strap.

Figure 6:
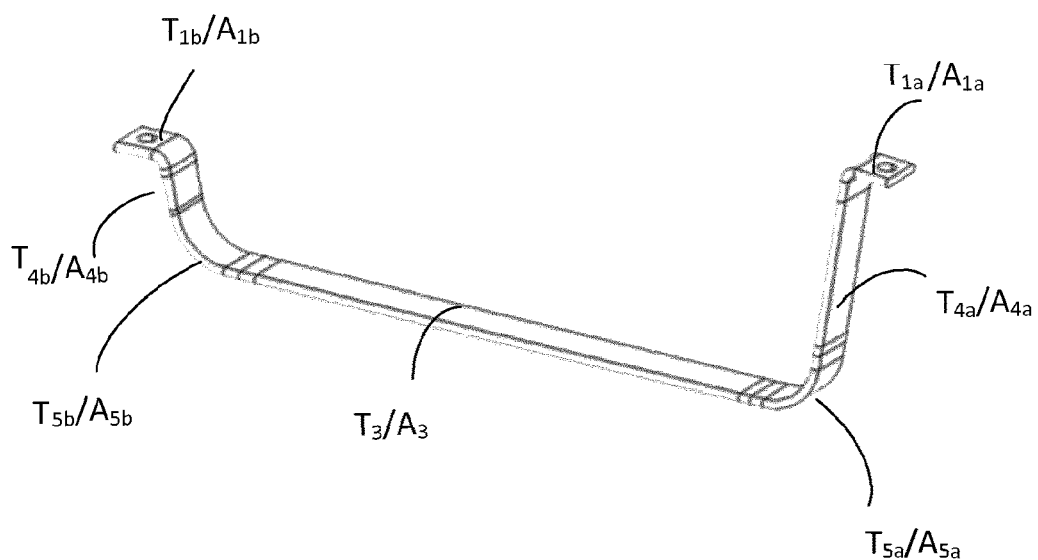
FIG. 6 is a schematic explanatory view showing the approximate locations the thicknesses and cross sectional areas mentioned in this disclosure.

In this context, the material thickness refers to the thickness of the extruded profile, or the resulting clamping strap, in a direction perpendicular to the longitudinal direction of the profile, and the cross sectional area refers to the cross sectional area in a direction transverse to the longitudinal direction. The approximate locations of the thicknesses and cross sectional areas mentioned in this disclosure are shown in the schematic explanatory view of FIG. 6.

Figure 10:
FIG. 10a-e schematically illustrate different cross sectional shapes that can be used for a clamping strap obtainable by method of the present disclosure.
Figure 10:
Figure 10:
Figure 10:
Figure 10:

Typical different cross sectional shapes that can be used for a clamping strap, as schematically illustrated in FIGS. 10a-e. The extruded profile may advantageously have outward edges which may have a rounded shape (FIG. 10b). Thereby, the weight may be further reduced and the possible fatigue stress level increased, since larger corner radii or increased thickness on outer edges reduces the risk of fatigue cracks at high loaded areas. The rounded edge shape along the profile edges can be provided at one or both of the longitudinal edges of the profile. Other cross sectional shapes that may be advantageous are: rectangular cross section (FIG. 10a); with bent side portions (FIG. 10c); with a depression (FIG. 10d); rounded (FIG. 10e).

In some embodiments, the method of forming the extruded profile into a clamping strap may involve forming the profile by bending step 102 into a desired shape, which may be roughly the shape of the final clamping strap. The method may further include locally thinning 103 or locally axially compressing 104 the profile at selected areas along the length of the profile, or a combination thereof. Local thinning will typically be performed prior to the bending step 102, and is intended to decrease material thickness in selected areas. In some embodiments, local axial compression 103 may be performed subsequent to the bending step 102, and may be intended to increase the material thickness and/or cross sectional area in selected areas. Accordingly, local thinning 103 and/or locally axially compressing 104 may be used to provide adequate strength in high load areas, and low weight in low load areas. The method may also include steps of cold forging apertures at the ends of the clamping strap, and press forming of grooves at certain locations.

In some embodiments, in the bending step, the method may include bending the extruded shape into a shape comprising a first end attachment portion, a second end attachment portion, and an intermediate portion located between the first and second end attachment portions in a longitudinal direction of the profile. The end attachment portions may be intended for, and adapted to, being secured to the structure, which may be to carry the hanging object held and supported by the clamping strap, and the intermediate portion may be configured to at least partially encircle the object when the clamping strap is mounted to the structure.

In some embodiments, the intermediate portion may suitably include a base portion, a first leg portion, and a first bend portion. The first leg portion may be located between the first end attachment portion and the first bend portion, and the first bend portion may be located between the first leg portion and the base portion, so that the first leg portion is at an angle with respect to the base portion. Likewise, the intermediate portion may also include a second leg portion, and a second bend portion, similarly positioned at the opposite end of the base portion, between the second end attachment portion and the base portion. One or both of the first and second end attachment portions may be at an angle with respect to the adjacent intermediate portion, and may then include an end bend portion located between the end attachment portion and the intermediate portion. In use, the end attachment portions and the bend portions may often be subjected to the highest load, while the base portion and the leg portion will be less subjected to high load. However, this may vary depending on the configuration of the hanging object.

In some embodiments, the local thinning of selected areas of the extruded profile may be performed prior to the bending step, and also before a cutting operation, in which the extruded profile may be cut into segments, which may each form a clamping strap. The thinning may be performed in a thinning operation 103 in which the profile is locally thinned in a longitudinal direction to obtain one or more thinned portions having a lower material thickness than the initial material thickness ($T_0$). In some embodiments, the thinning operation may include rolling, stretching, or press forming, or combinations thereof. The thinned portions may be sections of the clamping strap, which may be less subjected to high load during use. Suitably, the profile may be thinned along a section, which may form the base portion, so that the base portion attains a material thickness ($T_3$), where $T_3<T_0$, and along a section, which may be to form the first leg portion, so that the first leg portion attains a material thickness ($T_{4a}$), where $T_{4a}<T_0$. Thereby, the weight may be reduced in sections which carry less load during use, leading to a reduced total weight of the clamping strap.

In some embodiments, the local axial compressing of selected areas of the extruded profile may be performed subsequent to the bending step, and may be performed in an axial compression step 104 to obtain one of more axially compressed portions having a higher material thickness than the initial material thickness ($T_0$) and/or greater cross sectional area than the initial cross-sectional area ($A_0$). The selected areas of the extruded profile, which may be subjected to local axial compression are portions of the clamping strap, which may be subjected to high load during use. The axial compression step may thus suitably include local axial compression of the first and/or the second end attachment portions, so that they attain an increased material thickness ($T_{1a}$, $T_{1b}$), where $T_{1a}>T_0$ and/or $T_{1b}>T_0$, or a cross sectional area ($A_{1a}$, $A_{1b}$), where $A_{1a}>A_0$ and/or $A_{1b}>A_0$, and of the first second bend portion so that the first bend portion attains a material thickness ($T_{5a}$), where $T_{5a}>T_0$, or a cross sectional area ($A_{5a}$), where $A_{5a}>A_0$. Also the second bend portion may suitably be axially compressed so that it attains a material thickness ($T_{5b}$), where $T_{5b}>T_0$, or a cross sectional area (Aa), where $A_{5b}>A_0$. The second leg portion may also be axially compressed so that it attains a material thickness ($T_{4b}$), where $T_{4b}>T_0$, or a cross sectional area ($A_{4b}$), where $A_{4b}>A_0$. The end bend portions that may be located between the one or both of the first and second end attachment portions and the intermediate portion, may suitably also be subjected to axial compression to increase the material thickness and/or cross sectional area. Via the axial compression of the portion(s) that may be subjected to high load during use, more material may be located in areas where it is needed. In some embodiments, this may increase the resistance to material failure, and may improve the performance of the clamping strap.

In some embodiments of the method of manufacture of a clamping strap according to the present disclosure, the extruded profile may be subjected to either local thinning, or local axial compression, or to a combination thereof, in order to obtain a clamping strap with improved performance and/or lower weight. Thus, in one embodiment, a profile may be prepared by extrusion, so that may have a material thickness corresponding approximately to the desired final thickness in those length sections, which may be to form high loaded sections in the final clamping strap during use, and the extruded profile may then be locally thinned before bending it into its three-dimensional shape, so that the length sections, which are to form low loaded sections in the clamping strap during use, become thinned and gets a reduced thickness/cross-sectional area. Similarly, in another embodiment, a profile may be prepared by extrusion, so that may have a material thickness corresponding approximately to the desired final thickness in those length sections, which may form low loaded sections in the final clamping strap during use. After the profile has been bent into its three-dimensional shape, the length sections, which may be to form high loaded sections in the clamping strap during use, may be axially compressed so that they attain an increased thickness/cross-sectional area in the high loaded sections.

In some embodiments, the method may include both the thinning and the axial compression operations, in order to provide the most flexible production of clamping straps, thus allowing manufacture of clamping straps, which may comprise one or more portions having a wall gauge lower than the wall gauge of the initial material, and one or more portions having a wall gauge higher than the wall gauge of the initial material.

In order to facilitate attachment of the clamping strap to the structure, which is to carry the hanging object, an aperture configured to receive a fastener may be provided in one or both of the first and second end attachment portions. The present method may thus further include a cold forging step 105, in which an attachment aperture is formed in one or both of the first and second end attachment portions. The method may also further comprising press forming 106 of one or more longitudinal grooves in the clamping strap, in order to improve stiffness.

The thus obtained aluminum clamping strap may typically have a weight that is approximately 30-50% of the weight of a corresponding steel clamping strap intended for the purpose. The weight can be for example 125-200 g.

As indicated above, a clamping strap obtained by the above method may be in the form of an elongated and bent aluminum profile, and may be configured to hold and support a hanging object against a structure, which is to carry the hanging object. The clamping strap may comprise a first end attachment portion and a second end attachment portion each being adapted for attachment to the structure to which the hanging object is to be mounted, and an intermediate portion configured to at least partially encircle the hanging object when mounted to the structure. The intermediate portion may comprise a base portion located between the first and second end attachment portions, a first bend portion located between the first end attachment portion and the base portion, and a leg portion located between the first end attachment portion and the bend portion.

In some embodiments, the base portion may have a cross sectional area ($A_3$), the first bend portion has a cross sectional area ($A_{5a}$), the first a leg portion has a cross sectional area ($A_{4a}$), and the first end attachment portion (1a) has a cross sectional area ($A_{1a}$), where the cross sectional areas suitably relate to each other as follows: $A_3 \leq A_{5a} < A_{1a}$, and $A_{4a} \leq A_{5a} < A_{1a}$. Further, in some embodiments, the base portion and/or the first leg portion may suitably have a cross sectional area, which is 75 to 100% of the cross sectional area in the first bend portion, for example 75-95% or 80-90%, and the first end attachment portion may suitably have a cross sectional area, which is 150-250% of the cross sectional area in the base portion. These relations in cross sectional area between the different portions of the clamping strap give a reduced weight and at the same time improved mechanical performance to the clamping strap. The base portion and/or the first leg portion may suitably have a cross sectional area of 50-75 mm$^2$, the first bend portion may suitably have a cross sectional area of 75-100 mm$^2$, and the first end attachment portion may suitably have a cross sectional area of 125-200 mm$^2$. The greatest cross sectional area of the clamping strap may suitable be greater than or equal to 1.2 times the initial cross sectional area ($A_0$).

In some embodiments, the base portion may further include a portion having a greater cross sectional area than adjacent parts of the base portion. This portion may be used for connection of another strap oriented at an angle in relation to the clamping strap, and may be in a substantially perpendicular direction to the clamping strap.

Depending on the shape of the hanging object which is to be held and supported by the clamping strap, the clamping strap may be symmetric or asymmetric about a transverse centerline. For example, the clamping strap may be reflection symmetric about a transverse centerline, or it may be asymmetric, so that one or more of the clamping strap portions have a different shape in one end than the other.

As mentioned above, in some embodiments, the first and/or second end attachment portions may comprise an aperture configured to receive a fastener, which may be obtained by cold forging. Thereby, a region encircling the aperture and having increased material thickness may be formed, and/or the width of the end attachment portion may be increased in a transverse direction. Thus, the material in the area where the aperture is formed may be used in a beneficial way by means of cold forming, as opposed to being entirely removed, which would be the case if the aperture were formed by means of drilling or punching. Cold forging an aperture may be performed by using an upper tool comprising a punch, which is pressed against a flat surface of a lower tool and thereby relocates the material when forming an aperture in the end attachment portion, so that the end attachment portion has an increased material thickness, or an increased width in a transverse direction of the profile.

Figure 3:
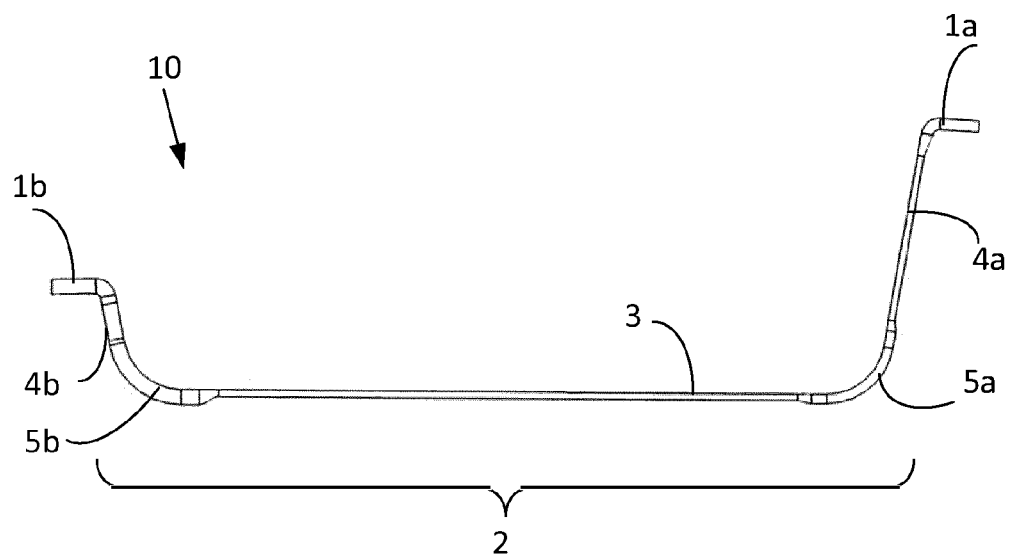
FIG. 3 is a schematic side view of a clamping strap that can be obtained by the method.
Figure 4:
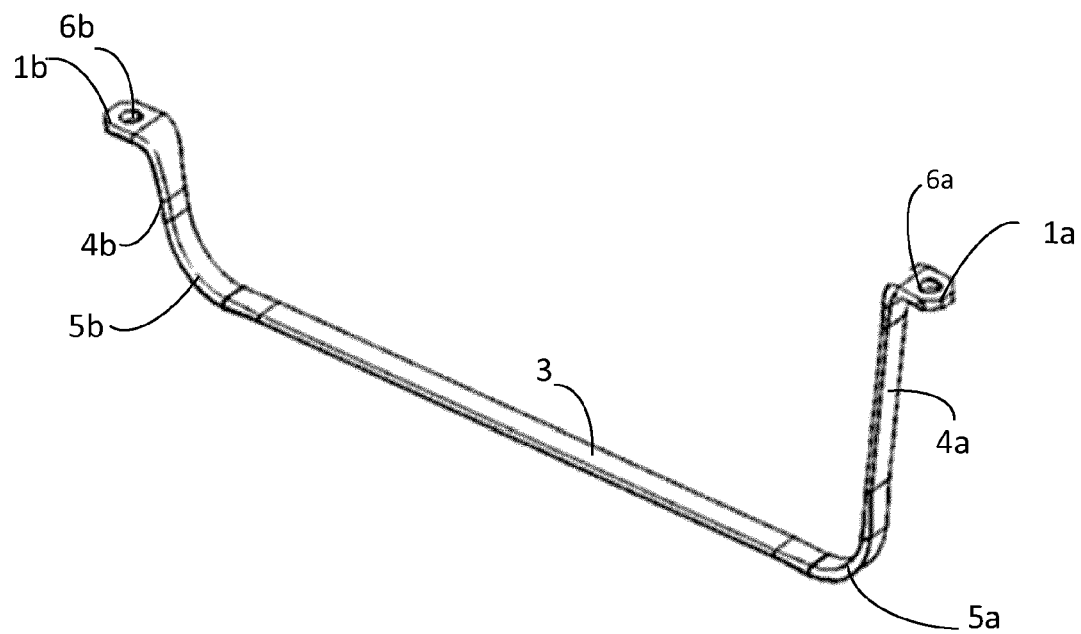
FIG. 4 is a schematic perspective view of the clamping strap shown in FIG. 3.

FIG. 3 is a schematic side view of an example of a clamping strap 10 obtainable by the above described method, and FIG. 4 shows a perspective view of the clamping strap in FIG. 3. In some embodiments, the clamping strap includes a first end attachment portion 1a and a second end attachment portion 1b, which may each be adapted for attachment to a structure so that the clamping strap can hold and support a hanging object. The clamping strap may further include an intermediate portion 2 comprising a base portion 3, a first bend portion 5a, and a leg portion 4a. The clamping strap shown in FIG. 3 may further include a second leg portion 4b, and a second bend portion 5b, and attachment apertures 6a, 6b is formed in the first and second end attachment portions 1a, 1b.

In some embodiments, the material thickness and/or the cross sectional area of the different portions of the clamping strap may be chosen with respect to the loads exerted on the clamping strap in the specific intended use, and may be obtained by thinning and/or axial compression as described above. FIG. 3 illustrates how the base portion 3 and the first leg portion 4a may have a lower thickness than the first end attachment portion 1a and the first bend portion 5a. In this case, the second bend portion 5b, the second leg portion 4b and the second end attachment portion 1b may all have higher material thickness than the base portion 3 and the first leg portion 4a.

Figure 5A:
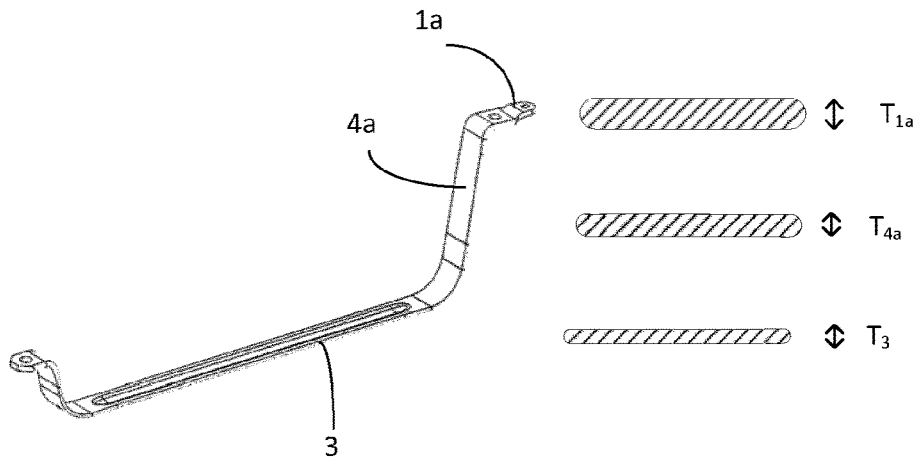
FIG. 5a is a schematic perspective view of another clamping strap.

FIG. 5a illustrates schematically the relations between different portions in a clamping strap which may only have been locally thinned at selected areas. Thus, the end attachment portion 1a can have thickness $T_{1a}$, which may correspond to the initial thickness $T_0$ of the extruded profile, and the first leg portion 4a may have a thickness $T_{4a}$, which may be lower than $T_{1a}$, and thus also lower than $T_0$, and the base portion 3 may have a thickness $T_3$, which may be lower than $T_{4a}$. The sections which have not been thinned may consequently have a greater thickness.

Figure 5B:
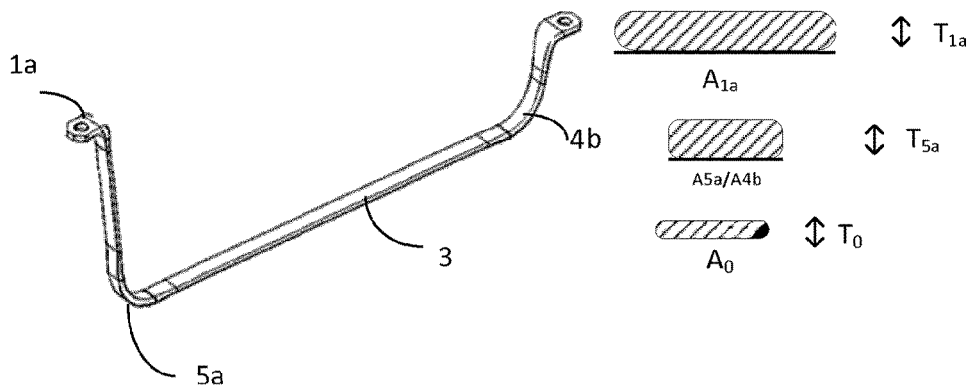
FIG. 5b is a schematic perspective view of yet another clamping strap.

FIG. 5b illustrates schematically the relations between different portions in a clamping strap which has been both locally thinned and locally axially compressed at selected portion. Thus, the end attachment portion 1a may have a thickness $T_{1a}$ or a cross sectional area $A_{1a}$, which may be greater than the thickness or cross sectional area of the first bend portion 5a and/or of the second leg portion 4b, which in turn may be greater than the thicknesses or cross sectional areas of the base portion 3 and the first leg portion 4a. In some embodiments, the portions that may not have been axially compressed may consequently have a lower thickness or a smaller cross sectional area. In some embodiments, the thickness or cross sectional area of the first bend portion 5a and/or of the second leg portion 4b may correspond to the initial thickness $T_0$ or cross sectional area $A_0$ of the extruded profile.

In some embodiments, the combination of local thinning and local axial compression may obtain the most flexible method of manufacturing a clamping strap.

Figure 7A:
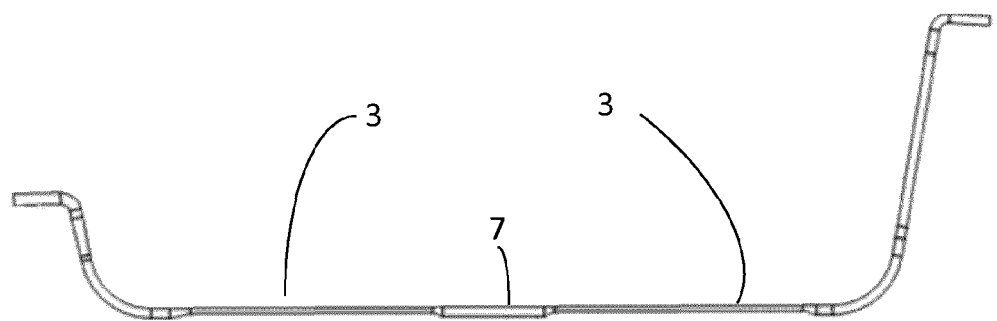
FIGS. 7a and 7b schematically illustrates a clamping strap comprising a portion in the base portion, which can be used for connection of other parts.
Figure 7B:
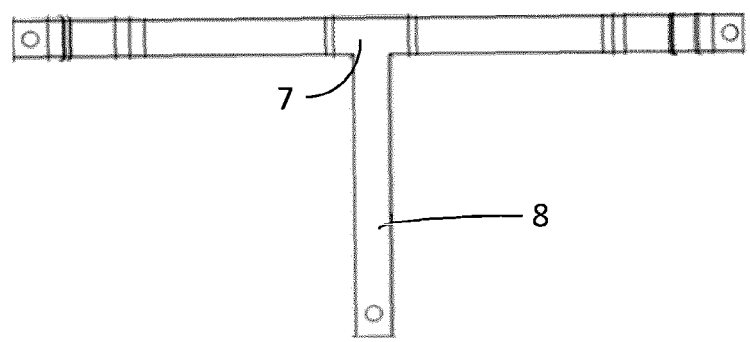

FIG. 7a-b illustrates another embodiment, where the base portion 3 of the clamping strap further includes a portion 7, which may have a greater cross sectional area than the adjacent parts of the base portion. This portion may be used for connection of another strap component 8 oriented at an angle in relation to the clamping strap, which may be in a substantially perpendicular direction to the clamping strap.

Figure 8A:
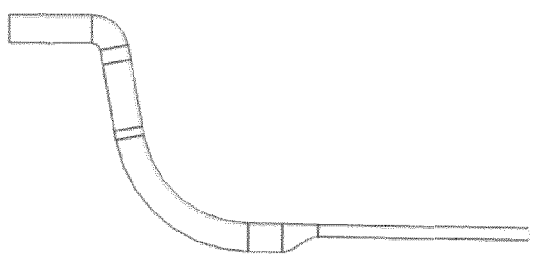
FIG. 8a-c schematically illustrate different alternative for the second leg portion of a clamping strap obtainable by method of the present disclosure.
Figure 8B:
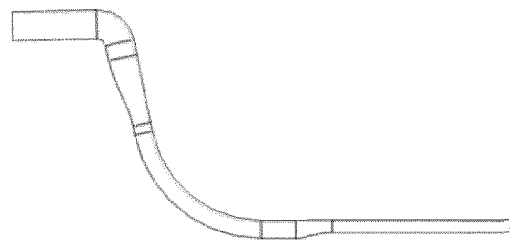
Figure 8C:
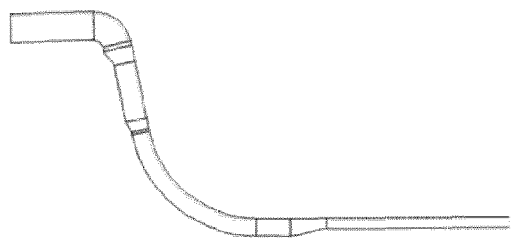

FIG. 8a-c schematically illustrate different embodiments for the second leg portion of a clamping strap obtainable by the above method. As shown, the material thickness and/or cross sectional area may be substantially the same along the entire second leg portion (FIG. 8a), or may be different in different sections thereof (FIGS. 8b-c), depending on the loads that the clamping strap will be subjected to during use.

Figure 9:
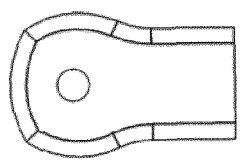
FIG. 9 schematically illustrates an end attachment portion of a clamping strap.

FIG. 9 schematically illustrates an end attachment portion of a clamping strap, in which an aperture has been cold forged, so that the width of the end attachment portion has increased.

EXPERIMENTS

A conventional steel strap design was compared with aluminum clamping strap designs, meeting similar space requirements and also designed according to the present disclosure, with the finite element method (FEM). Setting the weight and results from the steel strap to 100% for ease of comparison, the FEM simulation showed that the aluminum clamping straps would perform as follows

TABLE 1

| Strap No. | Strap material | Description | Weight [%] | Highest stress [%] |
|---|---|---|---|---|
| 1 | Steel | Conventional steel strap with longitudinal side flanges | 100 | 100 |
| 2 | Aluminum | Similar design as steel strap | 48 | 39 |
| 3 | Aluminum | Strap with thinned base portion according to the present disclosure | 36 | 34 |
| 4 | Aluminum | Strap with thinned base portion and axially compressed end attachment portions according to the present disclosure | 39 | 21 |

All straps were found to have the highest stress in the same point, in proximity in between the attachment portions and the first upper bend.

A physical test where some of the strap design were compared in a hydro-pulse testing jig showed that the aluminum design no. 2 only could fulfil 88% of the time that the steel design No. 1 could perform, before it failed, while the aluminum design No. 3 fulfilled 113% of the steel design. Aluminum design No. 4 was not tested, since it was expected to perform better than design No. 3 due to the lower stress level.

The invention shall not be considered limited to the illustrated embodiments, but can be modified and altered in many ways, as realized by a person skilled in the art, without departing from the scope defined in the appended claims.

The figures depict preferred embodiments for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

The invention claimed is:

1. A clamping strap (10) being configured to hold and support a hanging object (20) against a structure (21), which is to carry the hanging object, said strap (10) being in the form of an elongated and bent aluminium profile including
a first end attachment portion (1a) and a second end attachment portion (1b), each being adapted for attachment to the structure to which the hanging object is to be mounted, and
an intermediate portion (2) configured to at least partially encircle the hanging object when mounted to the structure, said intermediate portion (2) comprising a base portion (3) located between said first and second end attachment portions (1a, 1b), wherein the strap (10) further includes a first bend portion (5a) located between the first end attachment portion (1a) and the base portion (3), and a leg portion (4a) located between the first end attachment portion (1a) and the bend portion (5a), and wherein the base portion (3) has a cross sectional area ($A_3$), the first bend portion (5a) has a cross sectional area ($A_{5a}$), the first a leg portion (4a) has a cross sectional area ($A_{4a}$), and the first end attachment portion (1a) has a cross sectional area ($A_{1a}$), where and the first end attachment portion (1a) has a cross sectional area ($A_{1a}$), where $$A_3 = A_{5a} < A_{1a} \text{ or } A_3 < A_{5a} < A_{1a},$$

and $$A_{4a} = A_{5a} < A_{1a}, \text{ or } A_{4a} < A_{5a} < A_{1a}.$$

2. The clamping strap of claim 1, wherein the base portion (3) and/or the first leg portion (4a) have a cross sectional area, which is 75 to 100% of the cross sectional area in the first bend portion (5a), and the first end attachment portion (1a) has a cross sectional area, which is 150-250% of the cross sectional area in the base portion (3).

3. The clamping strap of claim 1, wherein the base portion (3) and/or the first leg portion (4a) have a cross sectional area of 50-60 mm², the first bend portion (5a) has a cross sectional area of 75-85 mm², and the first end attachment portion (1a) has a cross sectional area of 90-110 mm².

4. The clamping strap of claim 1, wherein the base portion (3) comprises a portion (7) having a greater cross sectional area than adjacent parts of the base portion, said portion being configured to allow connection of another strap component oriented at an angle in relation to the clamping strap.

5. A method (100) of manufacturing the clamping strap (10) of claim 1, the strap (10) being configured to hold and support a hanging object (20) against a structure (21), which is to carry the hanging object,
said method comprising
providing (101) an extruded elongated aluminium profile having an initial material thickness ($T_0$) and an initial cross-sectional area ($A_0$), said profile having a longitudinal direction, which coincides with the extrusion direction of the profile; and
forming the profile in a bending step (102) into a shape comprising a first end attachment portion (1a), a second end attachment portion (1b), and an intermediate portion (2) located between said first and second end attachment portions (1a; 1b) in a longitudinal direction of the profile (11), said intermediate portion (2) being configured to at least partially encircle the hanging object (20) when mounted to the structure (21);
wherein the method includes forming said profile by means of
locally thinning the profile in a longitudinal direction of the profile (11), in a thinning operation (103) to obtain one or more thinned portions having a lower material thickness than the initial material thickness ($T_0$);
or
locally axially compressing the profile in an axial compression step (104) to obtain one of more axially compressed portions having a higher material thickness than the initial material thickness ($T_0$) and/or greater cross-sectional area than the initial cross-sectional area ($A_0$);
or
by a combination of said thinning operation (103) and said axial compression step (104).

6. The method of claim 5, wherein the axial compression step (104) includes locally axially compressing said first and/or said second end attachment portions (1a; 1b), so that said first and/or second end attachment portions (1a; 1b) attains a material thickness ($T_{1a}$, $T_{1b}$), where $T_{1a} > T_0$ and/or $T_{1b} > T_0$, or a cross sectional area ($A_{1a}$, $A_{1b}$), where $A_{1a} > A_0$ and/or $A_{1b} > A_0$.

7. The method of claim 6, wherein the greatest cross-sectional area of the clamping strap (10) is $\geq 1.2 \times A_0$.

8. The method of claim 6, further comprising press forming (106) one or more longitudinal grooves.

9. The method of claim 5, wherein the bending step (102) includes forming the intermediate portion (2) into a base portion (3), a first leg portion (4a), and a first bend portion (5a), wherein the first leg portion (4a) is located between the first end attachment portion (1a) and the first bend portion (5a), and the first bend portion (5a) is located between the first leg portion (4a) and the base portion (3).

10. The method of claim 9, wherein the thinning operation (103) includes locally thinning the profile along a section of the profile (11), which is to form the base portion (3), so that said base portion attains a material thickness ($T_3$), where $T_3 < T_0$.

11. The method of claim 9, wherein the thinning operation (103) includes locally thinning the profile along a section of the profile (11), which is to form the first leg portion (4a), so that said first leg portion attains a material thickness ($T_{4a}$), where $T_{4a} < T_0$.

12. The method of claim 9, wherein axial compression step (104) includes locally axially compressing the first bend portion (5a) so that said first bend portion (5a) attains a material thickness ($T_{5a}$), where $T_{5a} > T_0$, or a cross sectional area ($A_{5a}$), where $A_{5a} > A_0$.

13. The method of claim 9, wherein the bending step (102) further includes forming a second leg portion (4b), and a second bend portion (5b) in the intermediate portion (2), wherein the second leg portion (4b) is located between the second end attachment portion (1b) and the second bend portion (5b), and the second bend portion (5b) is located between the second leg portion (4b) and the base portion (3).

14. The method of claim 13, wherein the axial compression step (104) includes locally axially compressing the second bend portion (5b) so that said second bend portion (5b) attains a material thickness ($T_{5b}$), where $T_{5b} > T_0$, or a cross sectional area ($A_{5b}$), where $A_{5b} > A_0$; and/or locally axially compressing the second leg portion (4b) so that said second leg portion (4b) attains a material thickness ($T_{4b}$), where $T_{4b} > T_0$, or a cross sectional area ($A_{4b}$), where $A_{4b} > A_0$.

15. The method claim 5, further including a cold forging step (105), in which an attachment aperture (6a, 6b) is formed in said first and/or said second end attachment portions (1a; 1b), whereby said first and/or said second end attachment portions (1a; 1b) attain a material thickness ($T_{1a}'$, $T_{1b}'$), where $T_{1a}' > T_{1a}$, and/or $T_{1b}' > T_{1b}$, or a cross sectional area ($A_{1a}'$, $A_{1b}'$) adjacent the aperture (6) in the longitudinal direction of the clamping step, where $A_{1a}' > A_{1a}$ and/or $A_{1b}' > A_{1b}$.

* * * * *